(12) United States Patent
Rauber et al.

(10) Patent No.: US 11,066,157 B2
(45) Date of Patent: Jul. 20, 2021

(54) CONSTANT-VELOCITY JOINT LINK WITH REDUCED AXIAL STIFFNESS

(71) Applicant: BELL HELICOPTER TEXTRON INC., Fort Worth, TX (US)

(72) Inventors: Richard E. Rauber, Euless, TX (US); Frank B. Stamps, Colleyville, TX (US)

(73) Assignee: Bell Textron Inc., Fort Worth, TX (US)

( * ) Notice: Subject to any disclaimer, the term of this patent is extended or adjusted under 35 U.S.C. 154(b) by 203 days.

(21) Appl. No.: 16/006,552

(22) Filed: Jun. 12, 2018

(65) Prior Publication Data

US 2018/0290738 A1 Oct. 11, 2018

Related U.S. Application Data

(63) Continuation of application No. 13/872,480, filed on Apr. 29, 2013, now Pat. No. 9,994,311.

(51) Int. Cl.
  *B64C 27/41* (2006.01)
  *B64C 29/00* (2006.01)
  *B64C 27/32* (2006.01)

(52) U.S. Cl.
  CPC .............. *B64C 27/41* (2013.01); *B64C 27/32* (2013.01); *B64C 29/0033* (2013.01)

(58) Field of Classification Search
  CPC ..... B64C 27/28; B64C 27/32–41; F16D 3/30; F16D 3/58; F16D 3/62
  See application file for complete search history.

(56) References Cited

U.S. PATENT DOCUMENTS

| | | | |
|---|---|---|---|
| 3,279,278 A | * | 10/1966 | Eldred ................... B29C 70/20 74/579 R |
| 3,362,252 A | | 1/1968 | Ditlinger |
| 3,603,173 A | | 9/1971 | Brooks et al. |
| 3,993,828 A | | 11/1976 | McCorsley, III |
| 4,118,952 A | | 10/1978 | Kobayashi |
| 4,300,410 A | * | 11/1981 | Raghupathi ........... B29C 53/564 156/172 |
| 4,552,035 A | | 11/1985 | Skipper |

(Continued)

FOREIGN PATENT DOCUMENTS

GB 2088793 * 11/1980

OTHER PUBLICATIONS

2005) Stiffness Basics. In: Mechanics of Microelectromechanical Systems, p. 46-47. Springer, Boston, MA. https://doi.org/10.1007/0-387-23037-8_1 (Year: 2005).*

(Continued)

*Primary Examiner* — Woody A Lee, Jr.
*Assistant Examiner* — Brian O Peters
(74) *Attorney, Agent, or Firm* — James E. Walton

(57) ABSTRACT

The present application provides a drive link for a constant-velocity joint of an aircraft rotor, the link connecting a drive hub attached to a driveshaft to a rotor yoke. The link comprises a leading bearing connected to the drive hub, a trailing bearing connected to the yoke, a central portion between the bearings, and a tension loop connecting the bearings. The tension loop is formed from a composite material and is formed as a continuous band. The tension loop transfers drive forces from the leading bearing to the trailing bearing for driving the yoke in rotation with the driveshaft.

19 Claims, 15 Drawing Sheets

(56) References Cited

U.S. PATENT DOCUMENTS

| | | | |
|---|---|---|---|
| 4,757,681 A | | 7/1988 | Matsuno et al. |
| 4,804,352 A | * | 2/1989 | Schmidt ................. B64C 27/41 |
| | | | 384/221 |
| 5,186,686 A | | 2/1993 | Staples et al. |
| 5,332,178 A | | 7/1994 | Williams |
| 6,203,434 B1 | * | 3/2001 | Albers ..................... F16D 3/62 |
| | | | 464/69 |
| 6,296,444 B1 | | 10/2001 | Schellhase et al. |
| 6,427,728 B1 | | 8/2002 | Maguire et al. |
| 7,793,420 B2 | | 9/2010 | Griep et al. |
| 8,167,561 B2 | | 5/2012 | Jones |
| 8,834,280 B2 | * | 9/2014 | Scheper ................... F16D 3/62 |
| | | | 464/69 |

OTHER PUBLICATIONS

Office Action dated Jan. 29, 2016 from counterpart U.S. Appl. No. 13/872,480.

Final Office Action dated May 26, 2016 from counterpart U.S. Appl. No. 13/872,480.

Advisory Action dated Aug. 17, 2016 from counterpart U.S. Appl. No. 13/872,480.

Office Action dated Oct. 4, 2016 from counterpart U.S. Appl. No. 13/872,480.

Final Office Action dated Apr. 21, 2017 from counterpart U.S. Appl. No. 13/872,480.

Office Action dated Aug. 31, 2017 from counterpart U.S. Appl. No. 13/872,480.

Notice of Allowance dated Feb. 9, 2018 from counterpart U.S. Appl. No. 13/872,480.

* cited by examiner

CONSTANT-VELOCITY JOINT LINK WITH REDUCED AXIAL STIFFNESS

BACKGROUND

1. Field of the Invention

The present application generally relates to constant-velocity joints for aircraft rotors and specifically relates to a constant-velocity joint link having reduced stiffness.

2. Description of Related Art

Designs of rotors and propellers for aircraft are often extremely complex. A large number of factors must be taken into account, including flexure of the rotor under heavy loads and the required motions of the rotor blades with respect to the drive mechanism. The considerations for proprotors, used as both propellers and rotors in aircraft such as a tiltrotor aircraft, can be more complex than usual. A tiltrotor aircraft 11 having three-blade proprotors 13A, 13B driven by engines carried in nacelles 15A, 15B, respectively, is shown in FIG. 1.

In a gimbaled rotor, joints must be provided between the driveshaft that carries torque from the engine and the yoke that drives the blades, giving rise to a relatively complex hub assembly. An example of such an assembly used in proprotors is described generally in U.S. Pat. No. 4,804,352, assigned to Lord Corporation, which is incorporated by reference herein as if set forth in full and shown in FIGS. 2 through 5.

FIG. 2 shows a rotor assembly 17, comprising hub assembly 19 and yoke 21. Yoke 21 has three arms 23 that extend radially and are configured for rotor blades (visible in FIG. 1) to be attached thereto. Hub assembly 19 comprises an upper hub-spring plate 25, lower hub-spring plate 27, and a constant-velocity (CV) joint 29 carried between hub-spring plates 25, 27.

Referring now specifically to FIGS. 3 through 5, a drive hub 31 has a splined opening 33 for receiving a splined driveshaft (not shown), and drive hub 31 is connected through pivoting linkage to yoke 21. The pivoting linkage comprises three pairs of members, each pair having a link 35 and clevis 37. Use of these links is described in detail in U.S. Pat. No. 5,186,686, assigned to Lord Corporation, which is incorporated by reference herein as if set forth in full.

Each end of links 35 has a spherical laminated elastomeric bearing 39, 41, with the leading-end bearing 39 of each link 35 being connected to hub 31 and the trailing-end bearing 41 of each link 35 being connected to a clevis 37. Clevises 37 are connected to hub-spring plates 25, 27 with bolts 43, and bolts 43 also fasten hub-spring plates 25, 27 to each other and to yoke 21. This provides a path for torque to be transferred from the driveshaft into drive hub 31, though drive hub 31 into links 35, through links 35 into devises 37, through clevises 37 into bolts 43 and hub-spring plates 25, 27, and through bolts 43 and hub-spring plates 25, 27 into yoke 21 for driving the blades. Hub-spring plates 25, 27 cooperate to carry the thrust and shear loads for the rotor.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

Figure 1:
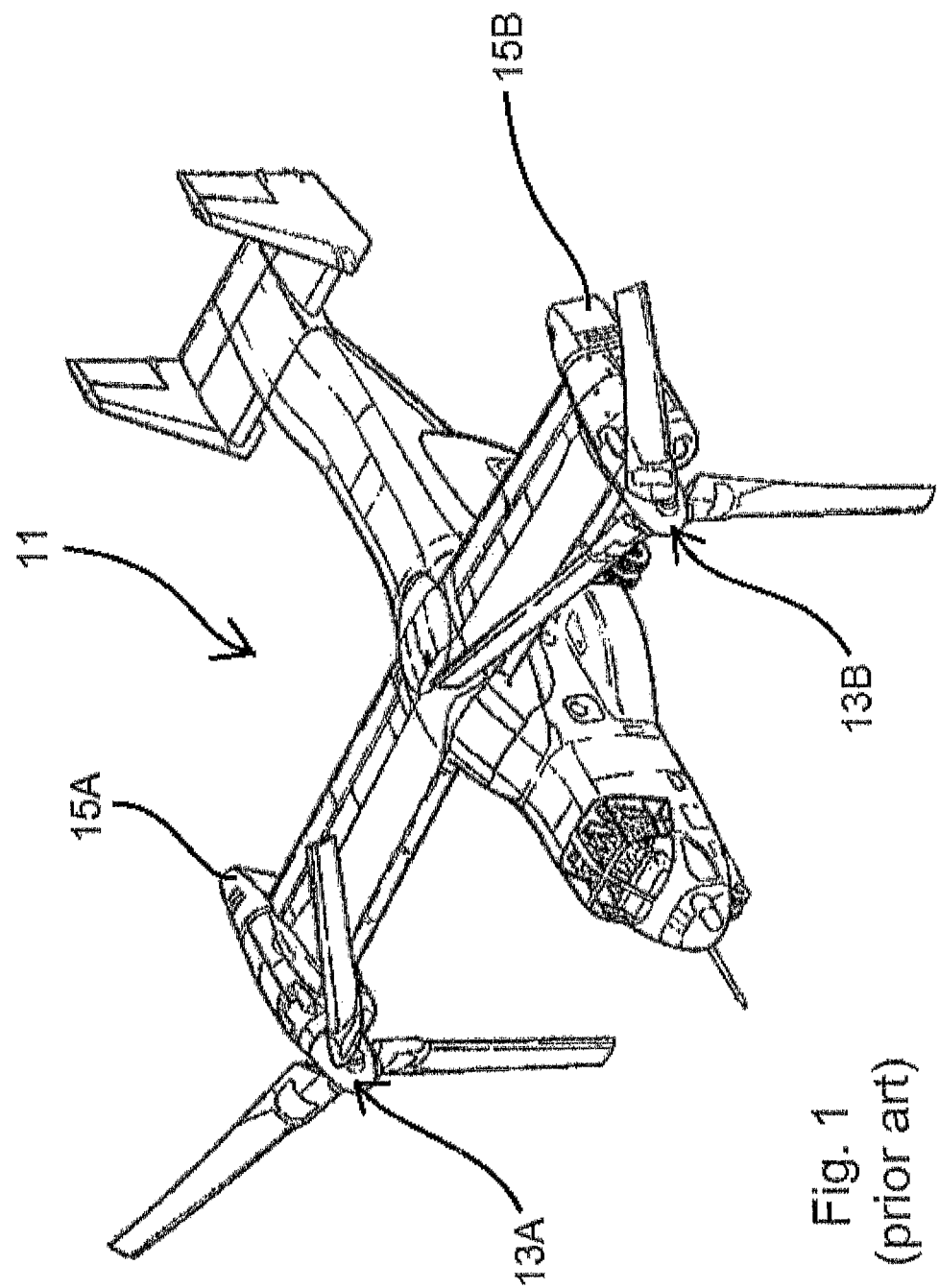
FIG. 1 is an oblique view of a prior-art tiltrotor aircraft.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," "inboard," "outboard," "leading," "trailing" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For example, the rotor assemblies are shown in FIG. 1 in a horizontal orientation and in FIGS. 2 through 5 in a generally vertical orientation. In the following description, components of the assembly may be described in relation to the vertical orientation, though it should be understood that this is for descriptive purposes only, as the orientation of the assembly will change during use.

The system and method of the present application provides for an improved constant-velocity-joint drive link, which allows for a selected spring rate to be utilized in connecting the drive hub and the yoke. The oscillatory drive link load is influenced by the stiffness of the link in the drive direction, but the prior-art links were designed without taking into account the relationship between the link loads and the hub-spring loads. The improved links allow for tailoring of the relationship between the spring rate of the links and the lateral spring rate of the hub spring to minimize the loads in both parts.

Referring again to FIG. 5, the prior-art link 35 has a unitary metal body 45 that comprises two bearing pockets 47, 49 on opposite ends of body 45. A leading bearing pocket houses leading bearing 39, and trailing bearing pocket 49 houses trailing bearing 41. Trailing pocket 49 is longitudinally spaced from leading pocket 47. Between pockets 47, 49 is a thick web that connects pockets 47, 49 and provides link 35 with high stiffness in the longitudinal direction, which is the direction of force as leading bearing 39 is driven by drive hub 31. This causes link 35 to have an axial spring rate higher than necessary and causes high loads on link 35 and the hub spring assembly.

Figure 2:
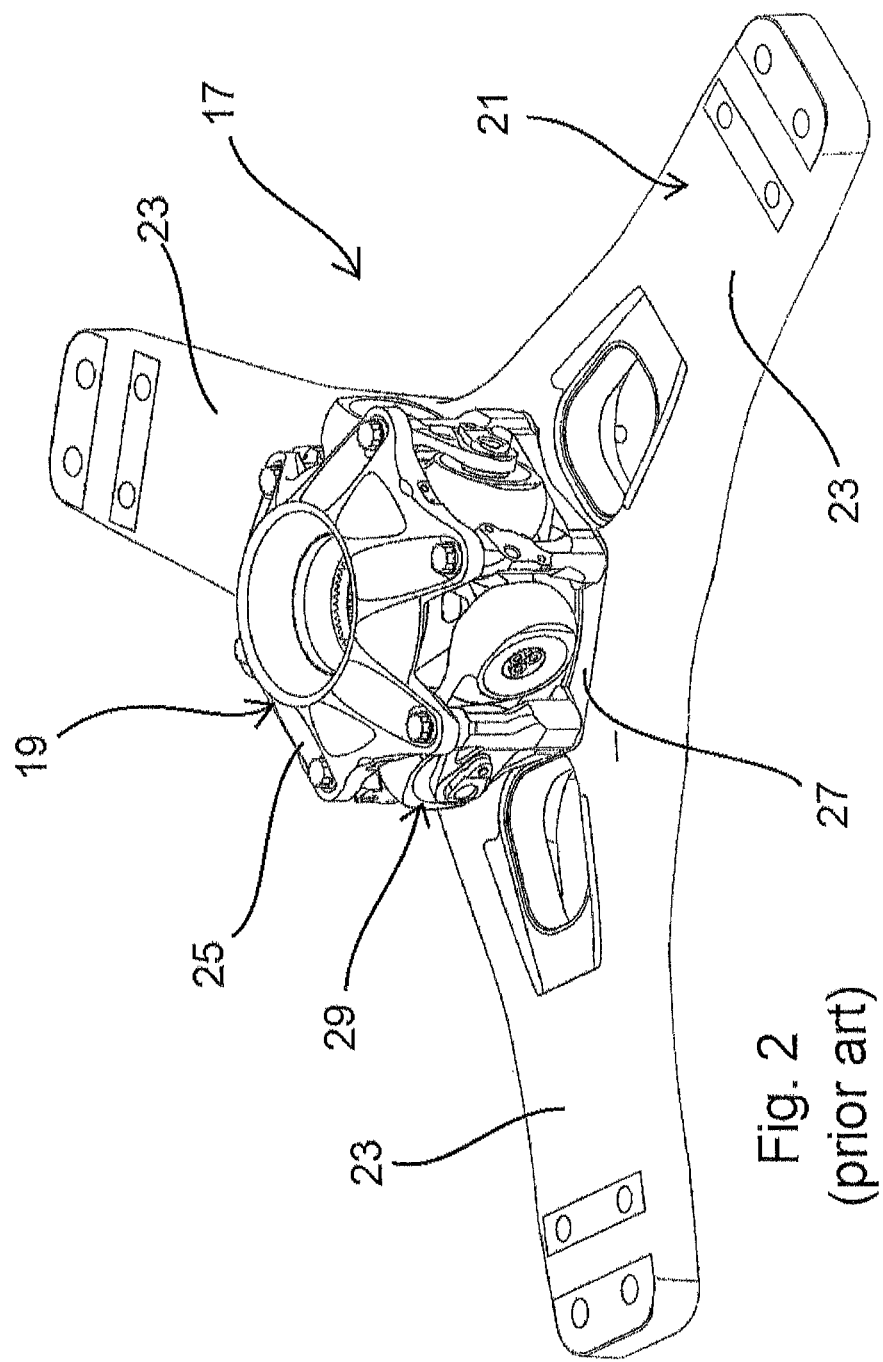
FIG. 2 is an enlarged oblique view of a portion of a rotor assembly of the aircraft of FIG. 1.
Figure 3:
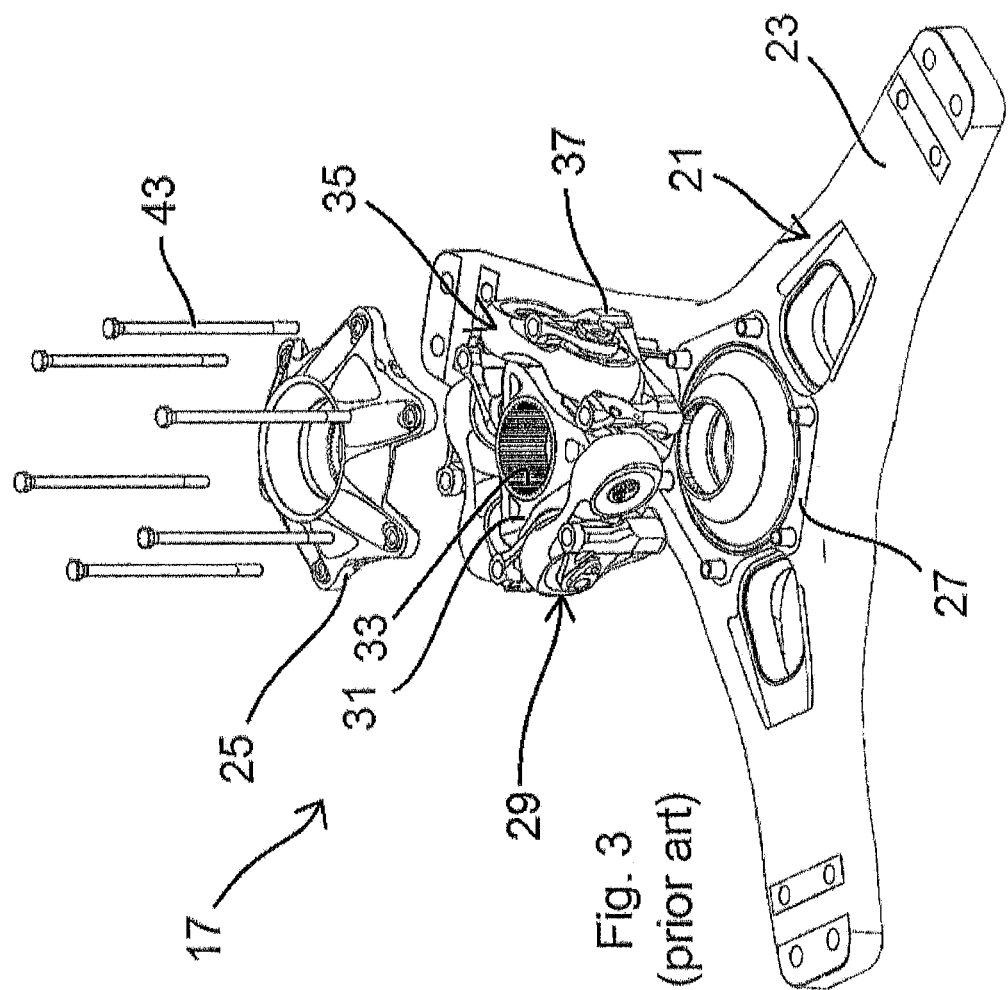
FIG. 3 is an exploded oblique view of the portion of a rotor assembly of FIG. 2.
Figure 4:
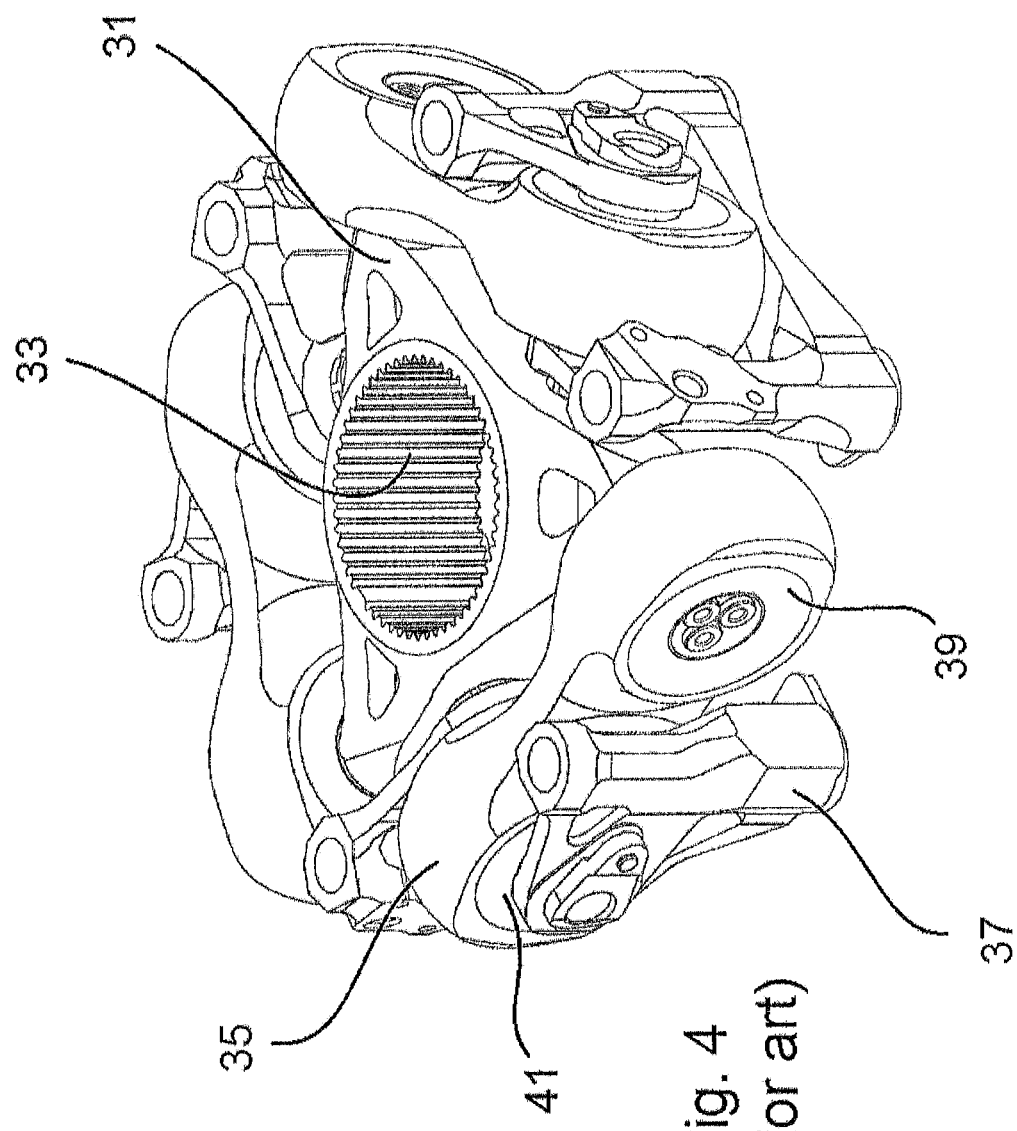
FIG. 4 is an oblique view of the portion of a rotor assembly of FIG. 2 with some of the components being removed for ease of viewing.
Figure 5:
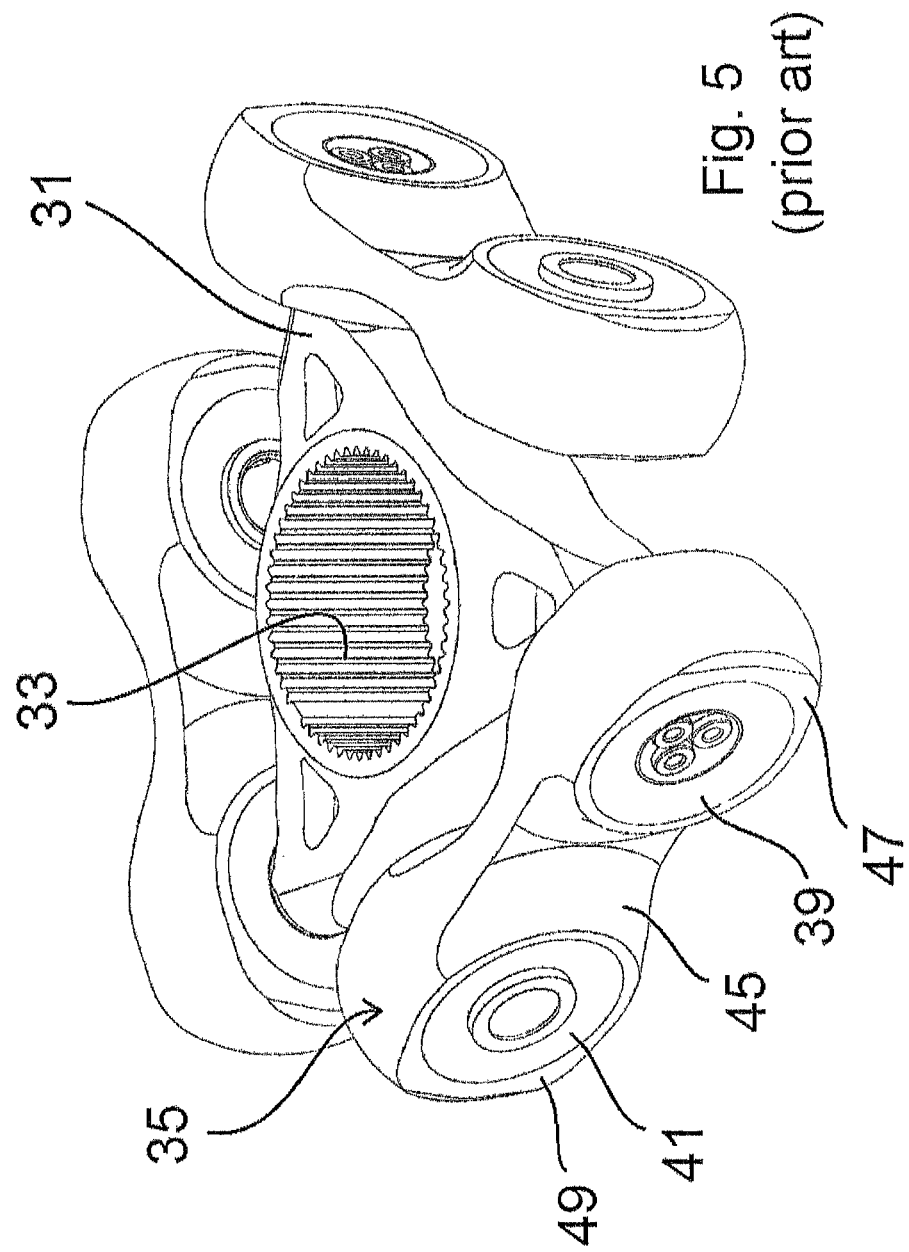
FIG. 5 is an oblique view of the portion of a rotor assembly of FIG. 2 with some of the components being removed for ease of viewing.
Figure 6:
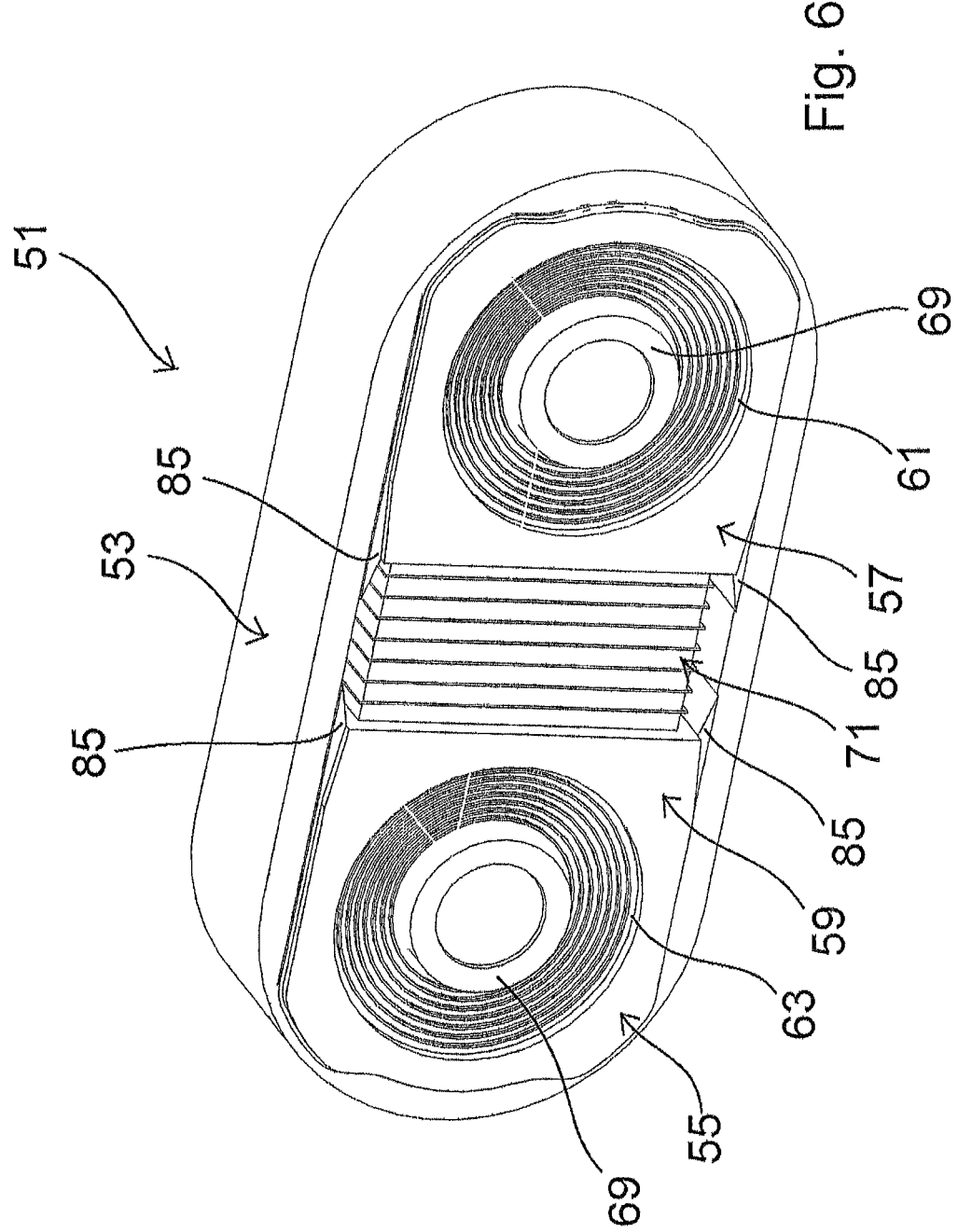
FIG. 6 is an oblique view of an improved constant-velocity-joint drive link configured for use in a rotor assembly like that shown in FIG. 2.

FIGS. 6 through 15 illustrate three embodiments of an improved drive link for a constant-velocity joint, and these links may be configured as components of a link system for replacing links 35 and clevises 37 in rotor assemblies 13A and 13B of aircraft 11 of FIG. 1, as shown in rotor hub assembly 17 of FIG. 2.

Referring to FIGS. 6 through 9, an improved drive link 51 comprises a circumferential, "racetrack"-style design, in which a tension loop 53 surrounds a bearing assembly 55. Bearing assembly 55 comprises a leading bearing housing 57 and a trailing bearing housing 59, with a leading bearing 61 located in leading housing 57 and a trailing bearing 63 located in trailing housing 59.

Figure 8:
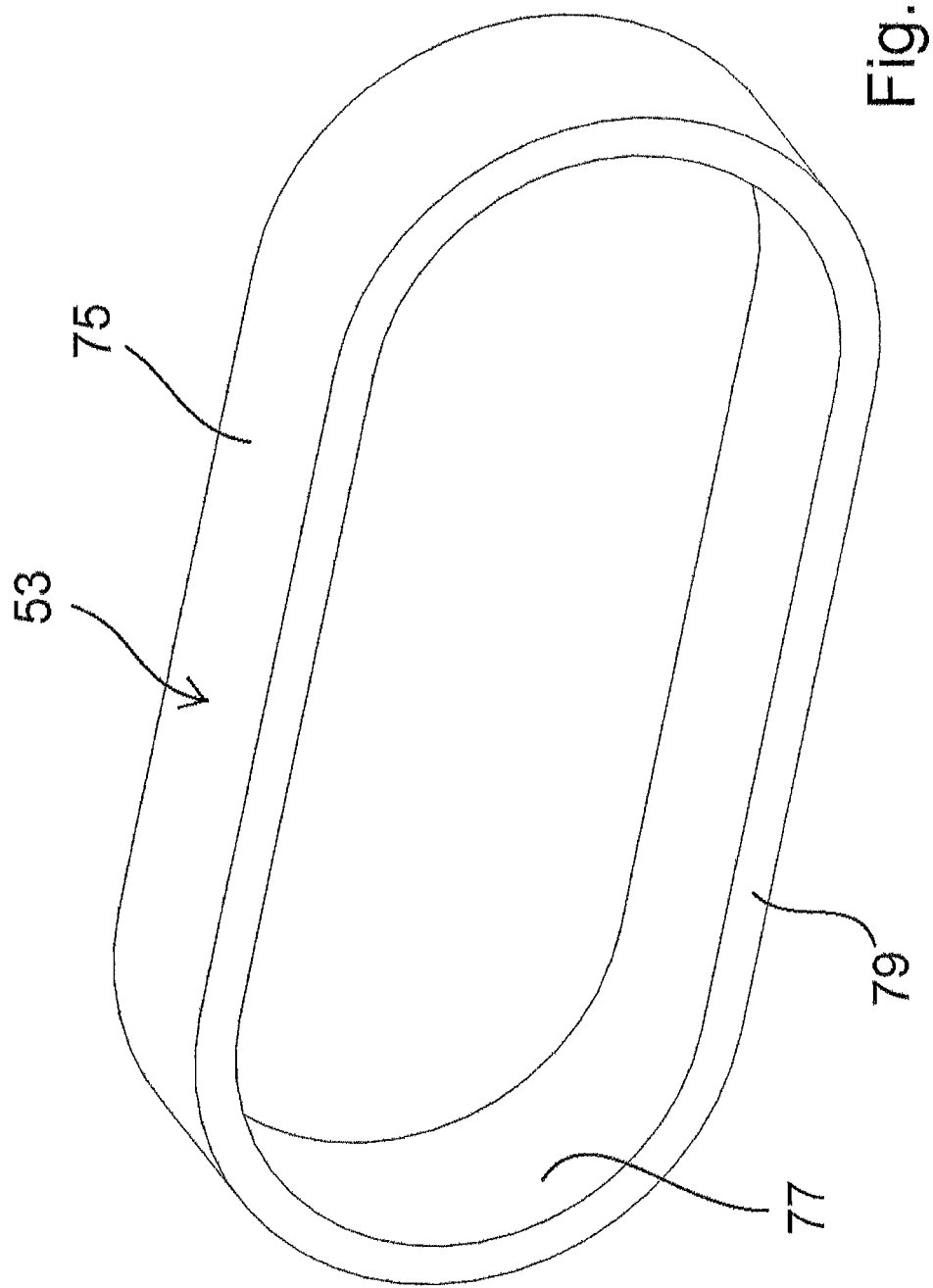
FIG. 8 is an oblique view of the tension loop of the link of FIG. 6.
Figure 9:
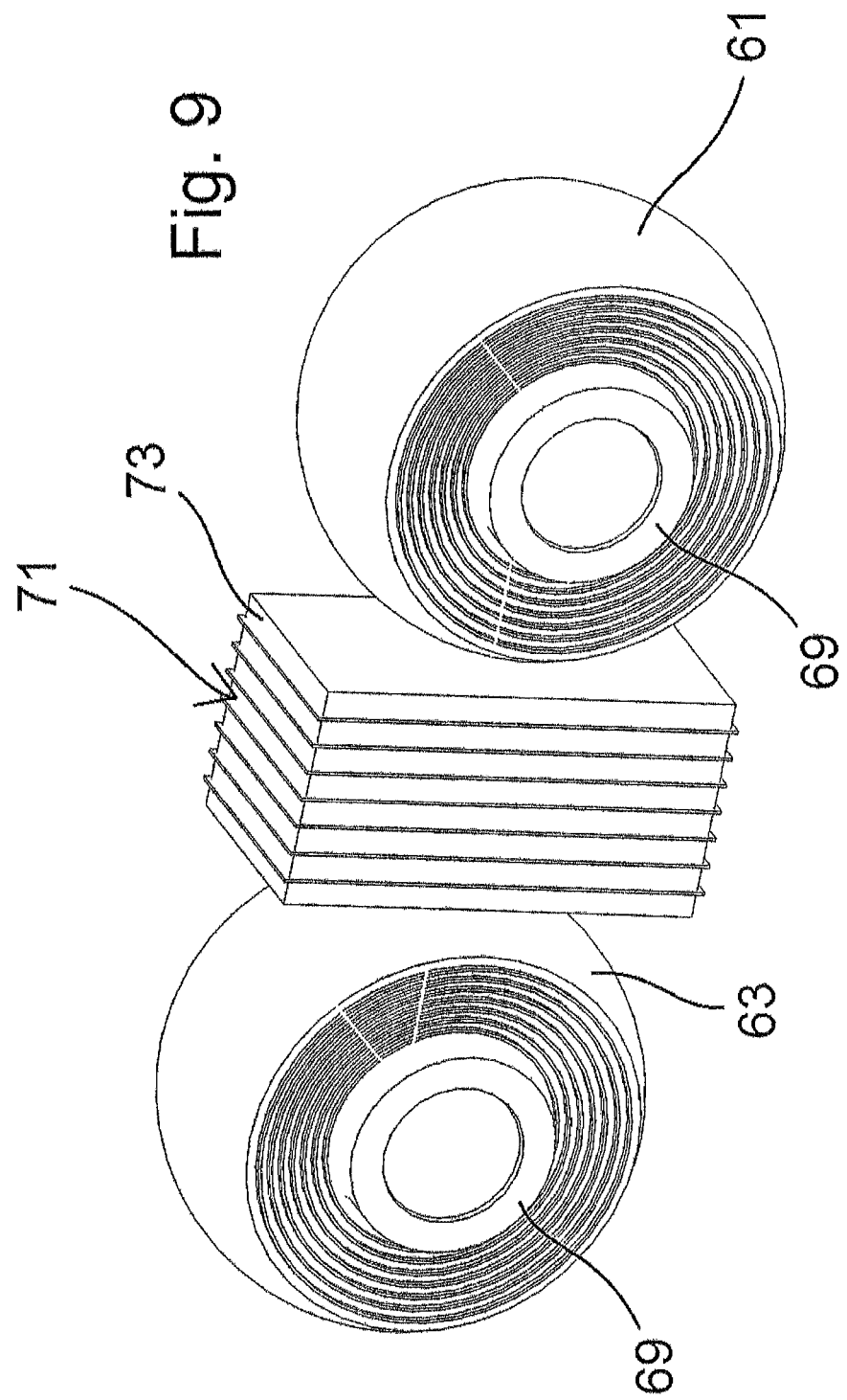
FIG. 9 is an oblique view of the bearing components of the link of FIG. 6.

Though designed to function in a similar way as part of a replacement structure, link 51 differs from prior-art link 35 in several ways, including construction materials and performance. As described above, link 35 is formed of metal, whereas link 51 is able to be formed, at least in part, from composite materials, such as fiberglass or carbon-fiber composites. Loop 53, which is shown removed from link 51 in FIG. 8, is preferably formed as a continuous band from fiberglass-reinforced plastic and preferably created through winding fiber or tape a selected number of times about the exterior of bearing assembly 55. Loop 53 has a selected axial spring rate that is determined by the number of fibers in the cross-section.

Figure 7:
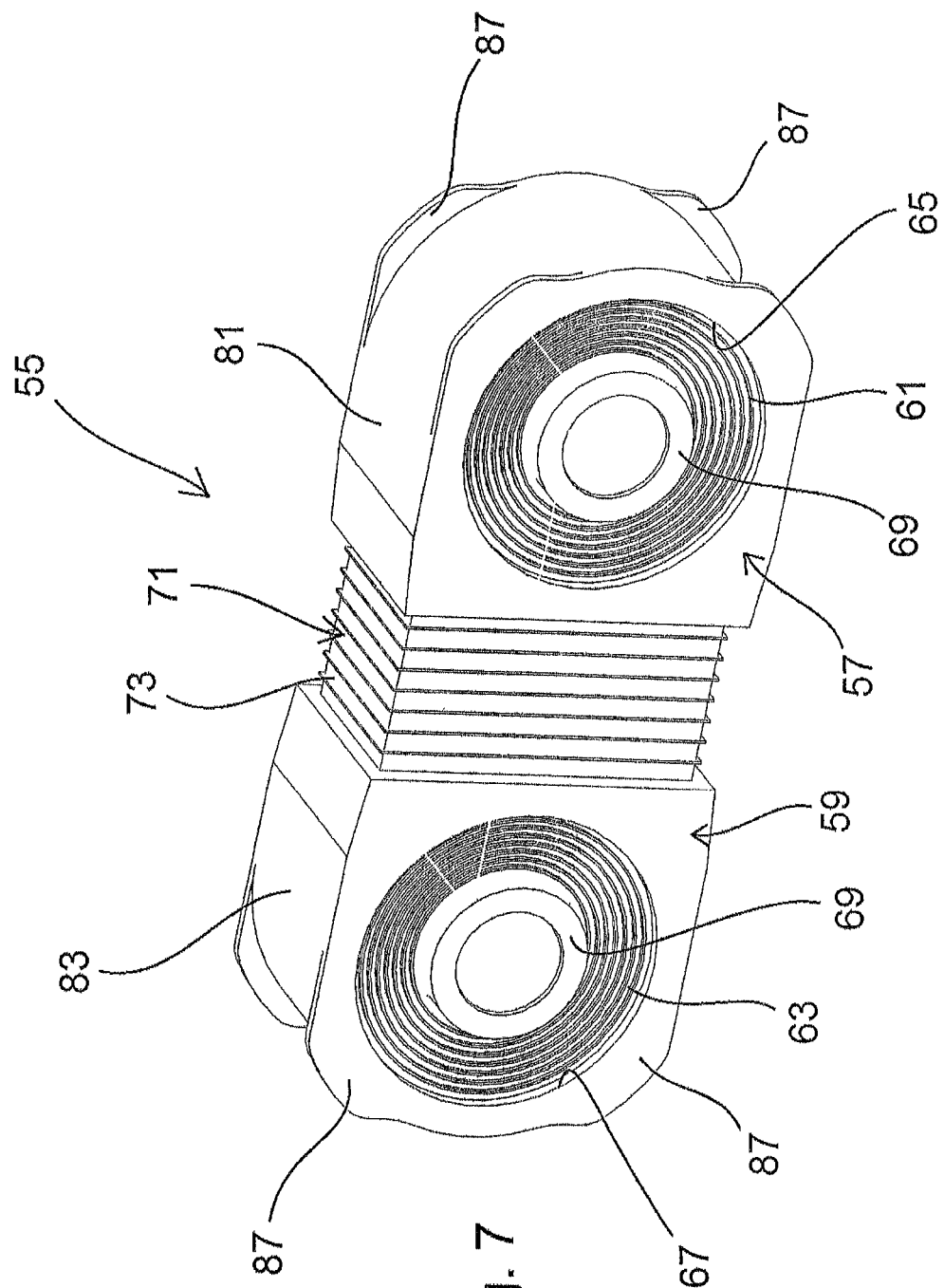
FIG. 7 is an oblique view of the link of FIG. 6 with a tension loop having been removed.

Bearing assembly 55 is shown in FIG. 7 with tension loop 53 removed. Each bearing housing 57, 59 has a spherically shaped bearing pocket 65, 67, respectively, for receiving one of bearings 61, 63, and bearing are shown removed from housing 57, 59 in FIG. 9. Bearings 61, 63 are preferably laminated, elastomeric spherical bearings, and each has a central portion 69 for engaging either drive hub 31 or a clevis. Bearing housings 57, 59 are preferably formed from metal, though housings 57, 59 may be designed in various applications to allow them to be formed of composite or other appropriate materials. If formed from a composite, loop 53 and housings 57, 59 may be constructed together to form an integrated part. Bearing assembly 55 also comprises a central flat-pad bearing 71, or a similar structure, that is adhered on each end to housings 57, 59. Bearing 71 preferably comprises a plurality of elastomer pads 73 joined together, and bearing 71 provides a resilient, compressible structure between housings 57, 59.

FIG. 8 shows tension loop 53 removed from link 51. In the embodiment shown, loop 53 has a constant cross-sectional shape, though loop 53 may be formed to have various shapes for tailoring loop 53 to a particular application. For example, loop 53 may have thinned sections to provide for clearance of adjacent components or, in appropriate applications, to provide for tailoring of bending or torsional rigidity. Loop 53 has an outer surface 75, an inner surface 77, and side surfaces 79. In the embodiment shown, surface 75, 77, 79 are continuous, smooth surfaces, though other embodiments may be configured to have different characteristics.

Improved link 51 allows for reduced link stiffness in tension by replacing the stiff central structure of link 35 with relatively thin loop 53 that connects bearing pockets 57, 59. Though the ends of flat-pad bearing 71 are adhered to housings 57, 59, tension forces created between housings 57, 59 as drive hub 31 drives leading bearing 61 are carried by the fibers of loop 53. Whereas link 51 having a lower spring rate equals a lower load, the spring rate must be maintained at a minimum level, as there must be sufficient stiffness to carry the positive torque transmitted from drive hub 31.

In addition, link 51 must be strong enough to withstand transient negative torque, which occurs due to the interconnection between the drive systems of the rotors. These transients may be approximately ⅙ to ¼ of the positive torque load. While composites excel when used in tension, such as experienced with positive torque, negative torque leads to compression of link 51. Therefore, link 51 must be engineered to handle both the positive and negative torque loads, which may be the determining factor in choosing a material for forming bearing housings 57, 59. A metal construction is preferred to ensure sufficient strength of link 51 in applications where it will experience negative torque. In the embodiment shown, flat-pad bearing 71 provides for a compressible structure between housings 57, 59 to absorb some of the compression load between housings 57, 59 created by negative torque.

A preferred method of constructing link 51 includes compressing bearing assembly 55 prior to forming loop 53, allowing loop 53 to be preloaded after assembly of link 51. Housings 57, 59 are formed around bearings 61, 63, respectively, and housings are joined to the ends of flat-pad bearing 71. Bearing assembly 55 is then compressed by moving housings 57, 59 toward each other a selected amount, and then loop 53 is formed by winding individual fibers or composite tape around outer surface 81 of housing 57 and outer surface 83 of housing 59. An optional thin elastomer sheet (not shown) may be located between inner surface 77 of loop 53 and outer surfaces 81, 83 to protect loop 53 from damage during use. Also, optional elastomer wedges 85 may be inserted between the inner ends of housings 57, 59 near flat-pad bearing 71 to provide additional protection to loop 53. Loop 53 is prevented from misalignment due to lateral movement relative to housings 57, 59 by planar protrusions 87 that extend from the ends of housings 57, 59.

The amount of reduction in forces due to mechanism kinematics experienced by link 51 that can be achieved by reducing the axial spring rate can be calculated using the equations shown below, wherein:

$$\delta_{KP} \rightarrow \text{Mechanism kinematic pinch (in)}$$

$$K_L \rightarrow \text{Link axial spring rate} \left(\frac{\text{lbs}}{\text{in}}\right)$$

$$K_{HS} \rightarrow \text{Hub Spring radial spring rate} \left(\frac{\text{lbs}}{\text{in}}\right)$$

$$F_L \rightarrow \text{Link kinematic 2/rev oscillatory loads (lbs)}$$

$$F_{HS} \rightarrow \text{Hub Spring kinematic 2/rev oscillatory load (lbs)}$$

"Kinematic pinch" is binding that is present during flapping in a 3-link hub design and that causes a twice per revolution (in the rotating system) in-plane displacement of the centering hub spring, and the value for kinematic pinch can be calculated (not shown).

The equations for approximating these loads on the link and spring hub are:

$$F_L = \frac{\delta_{KP} * K_L * K_{HS}}{1.5 * K_L + K_{HS}}$$

$$F_{HS} = 1.5 * F_L$$

To determine the loads on the link and hub spring, the following calculations include a calculated kinematic pinch value for 10 degrees of flapping and sample spring rate values for link 35 and an example hub spring:

$$\delta_{KP} = .060 \text{ in (for 10 deg flapping)}$$

$$K_L \rightarrow 300{,}000 \text{ lbs/in}$$

$$K_{HS} \rightarrow 600{,}000 \text{ lbs/in}$$

$$F_L = \frac{\delta_{KP} * K_L * K_{HS}}{1.5 * K_L + K_{HS}} = \frac{.060 * 300{,}000 * 600{,}000}{1.5 * 300{,}000 + 600{,}000} = 10{,}286 \text{ lbs}$$

$$F_{HS} = 1.5 * F_L = 1.5 * 10{,}286 = 15{,}429 \text{ lbs}$$

The resulting values of 10,286 lbs for the link load and 15,429 lbs for the hub-spring load can be compared to those calculated for an improved link, such as link 51, having a reduced spring rate. For example, a 10% reduction in the link spring rate with all other variables remaining unchanged produces a value of 9,672 lbs for the link load and 14,507 lbs for the hub-spring load, a 6% reduction for each. A 20% reduction in link spring rate results in a 12.5% reduction in each load.

Whereas these calculations show the effect of reducing the spring rate of link 51, the hub spring rate may also be selected for a minimum value by using these equations to choose the best spring rates of each component in the system.

Figure 10:
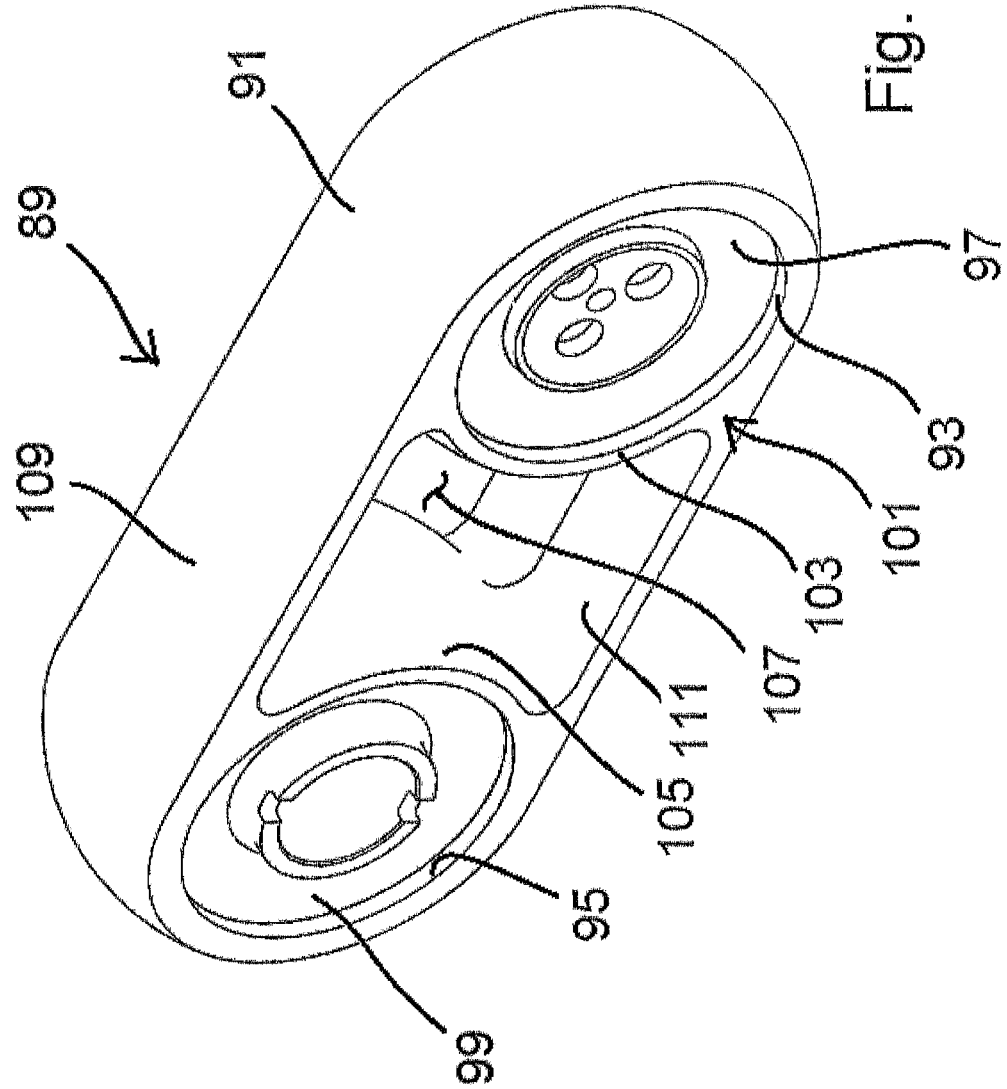
FIG. 10 is an oblique view of another embodiment of an improved constant-velocity-joint drive link configured for use in a rotor assembly like that shown in FIG. 2.
Figure 11:
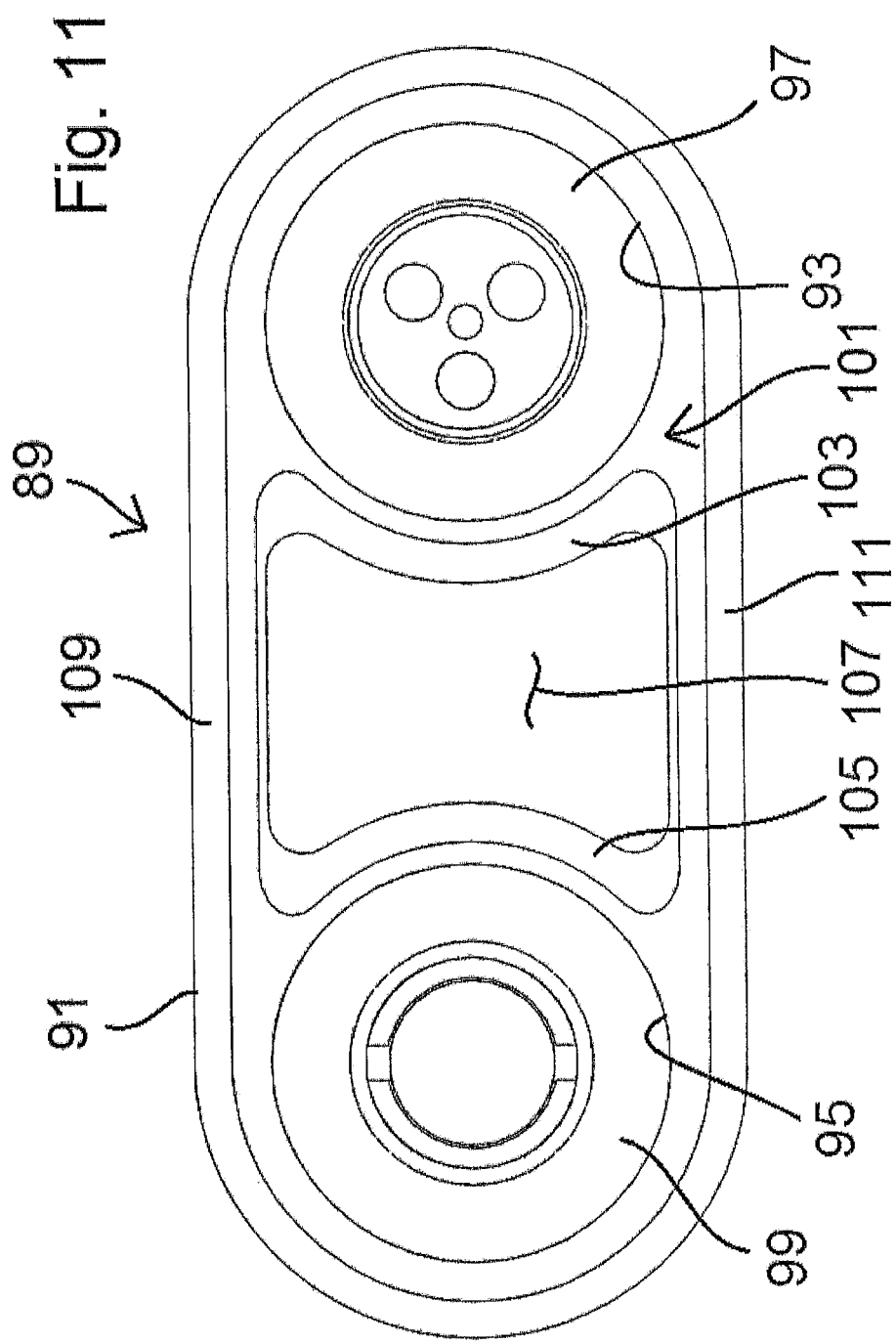
FIG. 11 is a side view of the link of FIG. 10.
Figure 12:
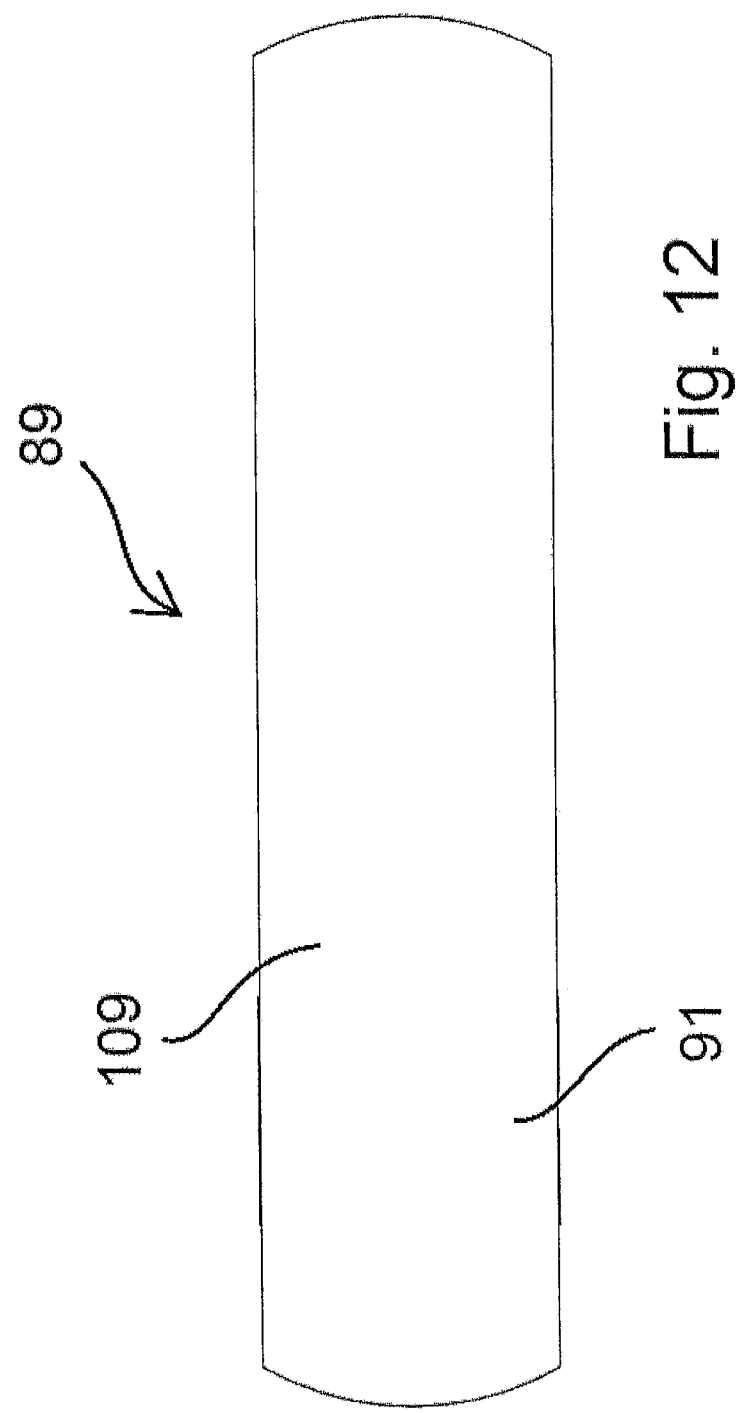
FIG. 12 is a top view of the link of FIG. 10.

Referring to FIGS. 10 through 12, another embodiment of an improved drive link 89 comprises a circumferential, "racetrack"-style design, in which a tension loop 91 is formed as a continuous band and surrounds a leading bearing pocket 93 and a trailing bearing pocket 95. Leading bearing 97 is located in leading pocket 93, and trailing bearing 99 is located in trailing pocket 95, and bearings 97, 99 are spherical laminated elastomeric bearings.

As with link 51, link 89 may be designed as part of a replacement structure for prior-art link 35 and clevis 37. Link 89 is able to be formed, at least in part, from composite materials, such as fiberglass or carbon-fiber composites. Loop 91 is preferably formed from fiberglass-reinforced plastic and preferably created by winding a selected number of times about the exterior of link 89. This construction provides link 89 with a selected axial spring rate that is determined by the number of fibers in the cross-section.

A central portion 101 comprises two pocket walls 103, 105 that cooperate with loop 91 to define bearing pockets 93, 95, respectively. In the embodiment shown, central portion 101 comprises an aperture 107 defined by pocket walls 103, 105 and that extends laterally through link 89. Alternatively, an optional web (not shown) may be formed between pocket walls 103, 105. Central portion 101 may be formed of a composite, metal, or other appropriate material. If formed from a composite, loop 91 and central portion 101 may be constructed together to form an integrated part. For any material, central portion 101 may be formed as a separate component onto which loop 91 is assembled, or loop 91 may be formed by winding fibers about central portion 101.

Link 89 minimizes the link stiffness by replacing the stiff central structure of link 35 with the relatively thin upper strap 109 and lower strap 111 of loop 91 that connect bearing pockets 93, 95. Straps 109, 111 are made as long as possible and as thin as possible to minimize the spring rate. In the embodiment shown in FIGS. 10 through 12, having aperture 107 in central portion 101 ensures that all of the axial forces exerted on link 89 pass between bearings only through the fibers of loop 91. Whereas link 89 having a lower spring rate equals a lower load, the spring rate must be maintained at a minimum level, as there must be sufficient stiffness to carry the positive torque transmitted from the drive hub.

In addition, as described above, link 89 must be strong enough to withstand transient negative torque. Therefore, link 89 must be engineered to handle both the positive and negative torque loads, which may be the determining factor in choosing a material for forming central portion 101. A metal construction may be preferred to ensure sufficient strength of link 89 in applications where it will experience negative torque.

Figure 13:
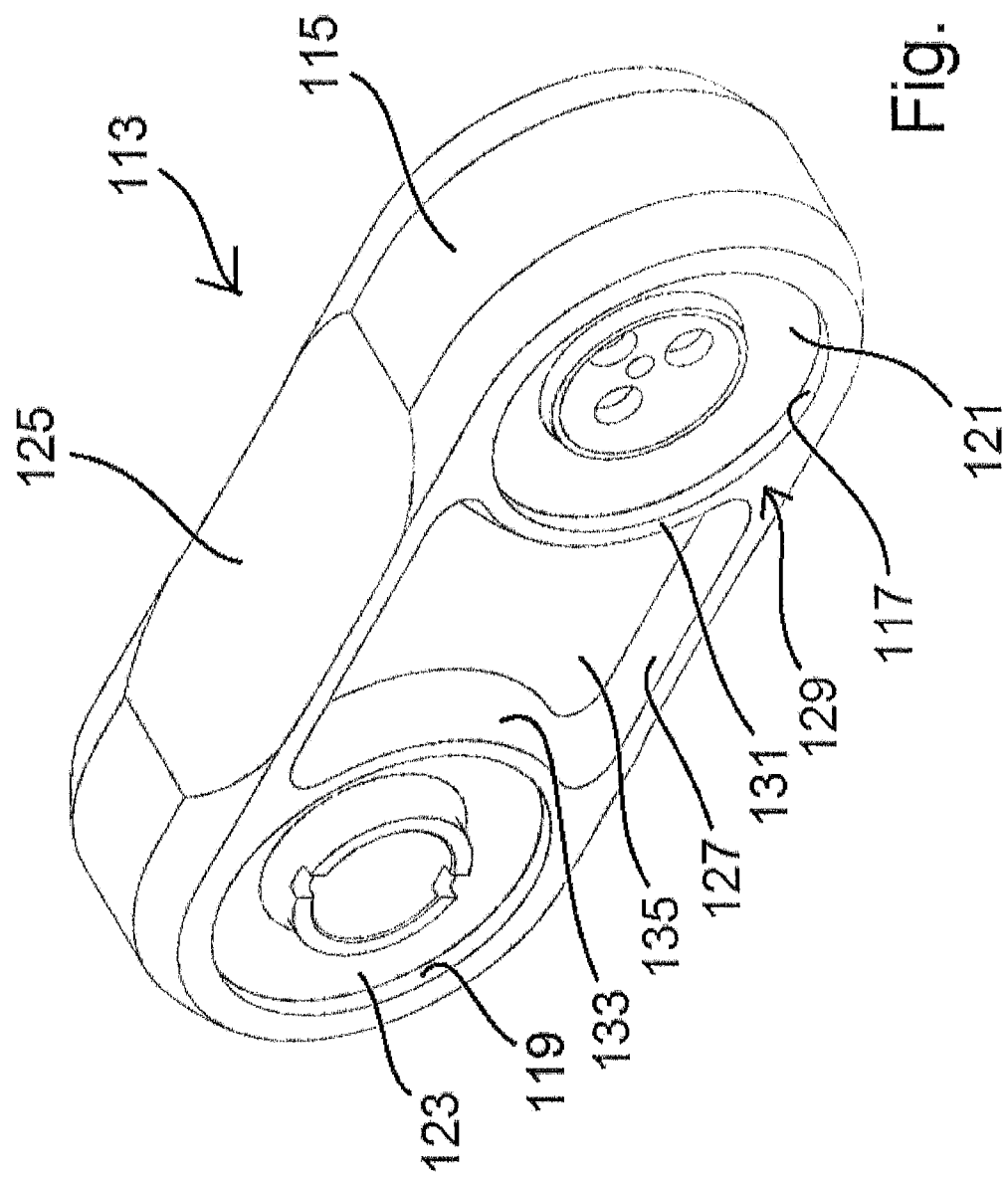
FIG. 13 is an oblique view of another embodiment of an improved constant-velocity-joint drive link configured for use in a rotor assembly like that shown in FIG. 2.
Figure 14:
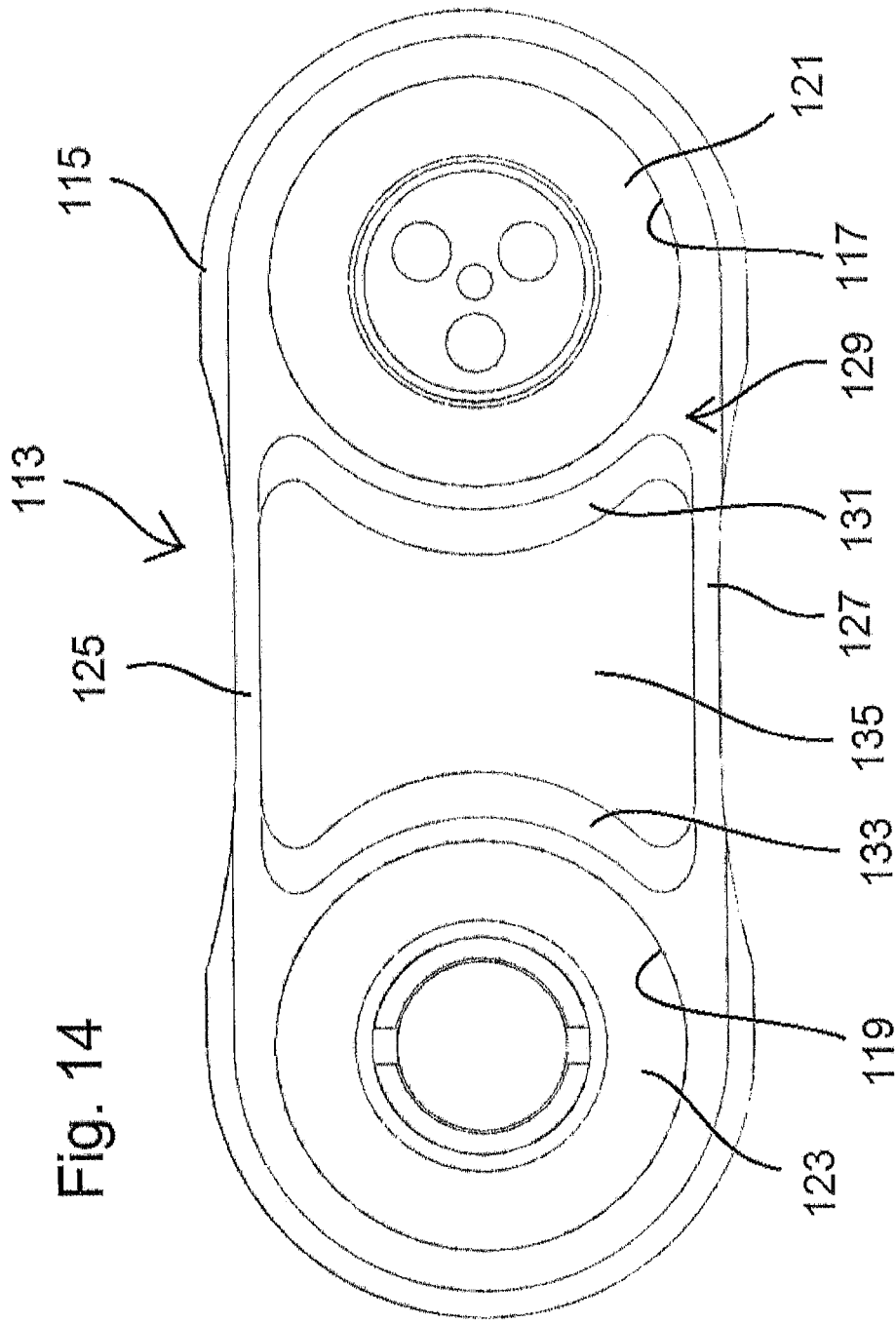
FIG. 14 is a side view of the link of FIG. 13.
Figure 15:
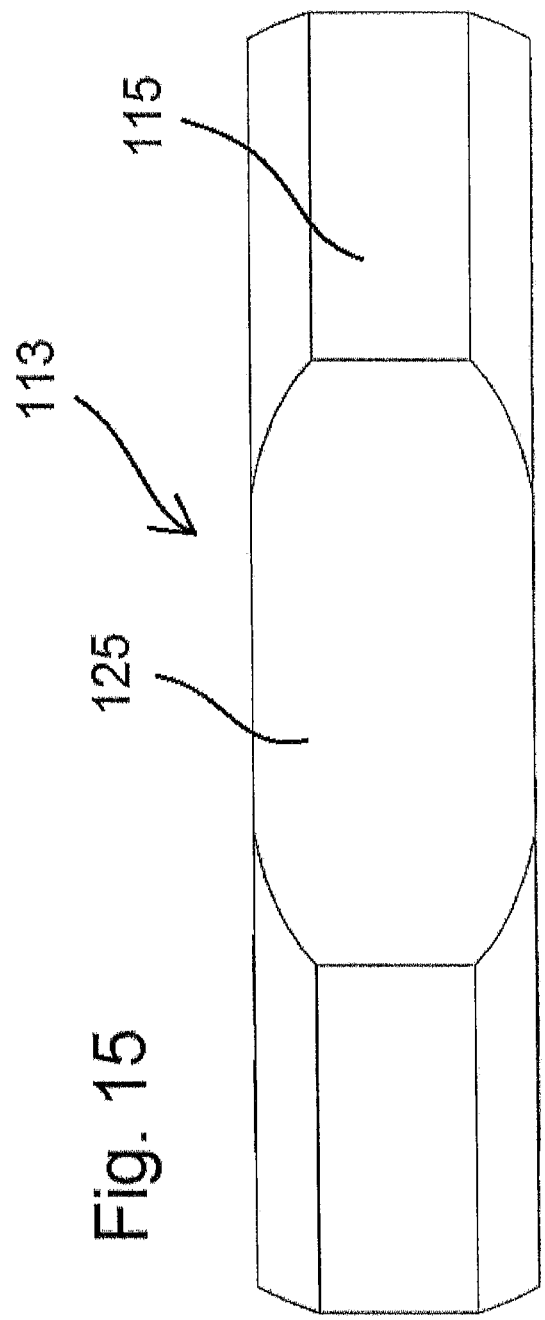
FIG. 15 is a top view of the link of FIG. 13.

Another embodiment of an improved link according to the present application is shown in FIGS. 13 through 15. Drive link 113 comprises a circumferential, "dog bone"-style loop 115 formed as a continuous band and surrounding a leading bearing pocket 117 and a trailing bearing pocket 119. A leading bearing 121 is located in leading pocket 117, and a trailing bearing 123 is located in trailing pocket 119. Like links 51 and 89, as described above, link 113 can be designed as part of a replacement structure for prior-art link 35 and clevis 37.

Link 113 is able to be formed, at least in part, from composite materials, such as fiberglass or carbon-fiber composites. Loop 115 is preferably formed from fiberglass-reinforced plastic and preferably created by winding a selected number of times about the exterior of link 113. Loop 115 has a varying cross-sectional shape. This construction provides link 113 with a selected overall axial spring rate that is determined by the number of fibers in the cross-section, but the varying cross-sectional shape allows for the tailoring of the thickness of upper strap 125 and lower strap 127.

Central portion 129 comprises two pocket walls 131, 133 that cooperate with loop 115 to define bearing pockets 117, 119, respectively. In the embodiment shown, central portion 129 comprises a stiff web 135 extending between straps 125, 127 and pocket walls 131, 133. Alternatively, an optional aperture (not shown) may be formed between pocket walls 131, 133. Central portion 129 may be formed of a composite, metal, or other appropriate material. If formed from a composite, loop 115 and central portion 129 may be constructed together to form an integrated part. For any material, central portion 129 may be formed as a separate component onto which loop 115 is assembled, or loop 115 may be formed by winding fibers about central portion 129.

Like link 89, link 113 minimizes the link stiffness by comprising relatively thin straps 125, 127 of loop 115. However, straps 125, 127 are thinned, resulting in the "dog bone"-style configuration. In the embodiment shown in FIGS. 13 through 15, axial forces exerted on link 113 pass between bearings through both the fibers of loop 115 and through web 135.

The drive links of the present application provide significant advantages, including providing for a lighter CV joint, lower link loads, and lower hub spring loads.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

The invention claimed is:

1. A drive link for a constant-velocity joint of a rotor of an aircraft, the link configured for connecting a drive hub attached to a driveshaft to a rotor yoke for driving the yoke in rotation with the driveshaft, the link comprising:
   a leading bearing located in a leading bearing pocket and configured for connection to the drive hub;
   a trailing bearing located in a trailing bearing pocket and configured for connection to the yoke, the trailing bearing pocket being spaced from the leading bearing pocket by a central portion; and
   a tension loop having a cross-section formed from a composite material or a metal depending on a desired spring rate of the tension loop, the tension loop being formed as a continuous band connecting the bearing pockets, the desired spring rate being based on the cross-section of the tension loop;
   wherein an edge of the tension loop runs tangentially from the leading bearing pocket to the trailing bearing pocket on both horizontal lengths of the tension loop;
   wherein a thickness of the tension loop varies such that the tension loop is radially thicker around the bearing pockets and thinner between the bearing pockets; and
   wherein the tension loop transfers drive forces from the leading bearing to the trailing bearing for driving the yoke in rotation with the driveshaft.

2. The drive link of claim 1, wherein the central portion comprises an elastomeric material.

3. The drive link of claim 1, wherein the central portion comprises an aperture.

4. The drive link of claim 1, wherein the central portion comprises a stiff web.

5. The drive link of claim 1, wherein the tension loop has a constant width.

6. The drive link of claim 1, wherein the tension loop is formed as a separate component.

7. The drive link of claim 1, wherein tension loop is formed as an integral component.

8. A method for controlling the spring rate of a drive link in a constant-velocity joint of a rotor of an aircraft, the method comprising:
   (a) providing a link having a leading bearing configured for connection to a drive hub and a trailing bearing configured for connection to a rotor yoke and spaced from the leading bearing by a central portion; and
   (b) forming a tension loop connecting the bearings, the tension loop having a cross-section with a selected axial spring rate based on the cross-sectional shape, configuration, or material type;
   wherein the material type is chosen from among multiple possible materials to form the tension loop; and
   wherein an edge of the tension loop runs tangentially from the leading bearing pocket to the trailing bearing pocket on both horizontal lengths of the tension loop; and wherein a thickness of the tension loop varies such that the tension loop is radially thicker around the bearing pockets and thinner between the bearing pockets.

9. The method of claim 8, wherein step (a) comprises providing the central portion with an elastomeric material.

10. The method of claim 8, wherein step (a) comprises providing the central portion with an aperture.

11. The method of claim 8, wherein step (a) comprises providing the central portion with a stiff web.

12. The method of claim 8, wherein step (b) forming the tension loop with a constant width.

13. An aircraft having a constant-velocity joint for transferring torque from a driveshaft to rotor hub assembly, the joint having a plurality of drive links configured for connecting a drive hub to a rotor yoke, at least one link comprising:
   a leading bearing located in a leading bearing pocket and configured for connection to the drive hub, the leading bearing fixed to an inner surface of the leading bearing pocket;
   a trailing bearing located in a trailing bearing pocket and configured for connection to the yoke, the trailing bearing fixed to an inner surface of the trailing bearing pocket, the trailing bearing pocket being spaced from the leading bearing pocket by a central portion having an aperture; and
   a tension loop having a cross-section formed from a metal or a single, continuous layered composite material, the tension loop being formed as a continuous band externally connecting the bearing pockets;
   wherein the metal or the single, continuous layered composite material is chosen based on a selectively chosen spring rate of the tension loop;
   wherein the selectively chosen spring rate of the tension loop is determined by a number of fibers in the cross-section of the tension loop;
   wherein an edge of the tension loop runs tangentially from the leading bearing pocket to the trailing bearing pocket on both horizontal lengths of the tension loop;

wherein the tension loop only transfers axial drive forces from the leading bearing to the trailing bearing for driving the yoke in rotation with the driveshaft; and wherein the tension loop is formed as an integral component with the central portion; and the thickness of the tension loop varies such that the tension loop is radially thicker around the bearing pockets and thinner between the bearing pockets.

14. The drive link of claim 13, wherein the central portion comprises an elastomeric material.

15. The drive link of claim 13, wherein the central portion comprises a stiff web.

16. The drive link of claim 13, wherein the tension loop is formed as a separate component.

17. The drive link of claim 13, wherein tension loop is formed as an integral component.

18. The method according to claim 8, wherein step (b) comprises forming the tension loop to have the selected axial spring rate, a fiber count associated with the cross-sectional shape or configuration, and a selected radial spring rate; and wherein the fiber count determines the selected axial spring rate.

19. The drive link of claim 1, wherein the cross-section of the tension loop has a number of fibers that determines the desired spring rate.

* * * * *